United States Patent
Gauthier et al.

[19]

[11] Patent Number: 6,079,921

[45] Date of Patent: Jun. 27, 2000

[54] ANCHOR BOLT FOR FRIABLE MATERIAL

[75] Inventors: Alain Gauthier, Saint Jean de Muzols; Jean-Paul Barthomeuf, Bourg de Peage, both of France

[73] Assignee: Societe de Prospection et d'Inventions Techniques Spit, Valance, France

[21] Appl. No.: 09/270,001

[22] Filed: Mar. 16, 1999

[30] Foreign Application Priority Data

Mar. 16, 1998 [FR] France .................................. 98 03175

[51] Int. Cl.$^7$ ............................. F16B 37/12; F16B 39/28
[52] U.S. Cl. ......................... 411/110; 411/178; 411/307; 411/387.5; 411/418
[58] Field of Search ................................. 411/110, 115, 411/140, 307, 310, 311, 217, 220, 263, 399, 387.3, 387.5, 418, 178

[56] References Cited

U.S. PATENT DOCUMENTS

| | | | |
|---|---|---|---|
| 1,184,173 | 5/1916 | Gehring | 411/140 |
| 2,419,555 | 4/1947 | Fator | 411/387.3 |
| 3,295,579 | 1/1967 | Medal | 411/140 |
| 3,667,526 | 6/1972 | Neuschotz | 411/110 |
| 3,711,138 | 1/1973 | Davis . | |
| 4,003,287 | 1/1977 | Ziaylek, Jr. | 411/418 |
| 5,044,853 | 9/1991 | Dicke | 411/311 |
| 5,190,425 | 3/1993 | Wieder et al. . | |
| 5,308,203 | 5/1994 | McSherry et al. | 411/387.5 X |
| 5,482,418 | 1/1996 | Giannuzzi | 411/399 X |
| 5,529,449 | 6/1996 | McSherry et al. | 411/387.5 X |
| 5,562,672 | 10/1996 | Huebner et al. | 411/307 X |

FOREIGN PATENT DOCUMENTS

| | | |
|---|---|---|
| 0 425 358 | 5/1991 | European Pat. Off. . |
| 0 575 295 | 12/1993 | European Pat. Off. . |
| 2 588 332 | 4/1987 | France . |
| 93 01 098 | 5/1993 | Germany . |
| 2 208 417 | 3/1989 | United Kingdom . |
| 96/16273 | 5/1996 | WIPO . |

OTHER PUBLICATIONS (1) French Search Report.

*Primary Examiner*—Neill Wilson
*Attorney, Agent, or Firm*—Lowe Hauptman Gopstein Gilman & Berner

[57] ABSTRACT

The anchor bolt comprises a generally hollow body (1) with a drilling end (4), a supporting collar (5) at the other end and an external screw thread (6). The collar (5) forms two openings (10, 11), diametrically opposed, for receiving an anti-rotation pin (8, 9) removably fixed to the collar (5) and movable in the opening (10, 11). The pins (8, 9) are intended to anchor both in the collar (5) and in the receiving material, in order to prevent rotation of the bolt.

11 Claims, 1 Drawing Sheet

ANCHOR BOLT FOR FRIABLE MATERIAL

TECHNICAL FIELD

The invention relates to an anchor bolt for friable material, such as a dry partition panel, e.g. of a plasterboard type.

BACKGROUND ART

Anchor bolts for friable material, generally comprises a hollow body with a drilling end, a supporting collar at the other end and an external screw thread. A bolt of this kind is disclosed for example, in the document EP-0 165 674.

To insert a bolt of this type into a friable wall, the bolt simply has to be screwed into the wall without a hole having to be pre drilled in the wall as is the case with numerous other anchor bolts. This greatly simplifies fixing.

With bolts of this type, there is nevertheless a risk of the bolt loosening and therefore accidentally withdrawing from the wall.

The invention aims to obviate this disadvantage.

SUMMARY OF THE INVENTION

To this end, the invention relates to an anchor bolt for friable material, comprising a generally hollow body with a drilling end, a supporting collar at the other end, an external screw thread and anti-rotation structure that includes at least one antirotation pin located both in the supporting collar and in the material.

Advantageously, the supporting collar forms an opening for receiving the anti-rotation pin that is movable in the opening.

The bolt has an axis. The anti-rotation pin is furthermore advantageously movable in a direction parallel to the axis.

Once the bolt has been inserted into the friable material, an operator can then strike the removably fixed pins so that they penetrate into the material and prevent rotation of the collar and consequently the bolt.

In a particular embodiment, the supporting collar forms two diametrically opposite openings for receiving an anti-rotation pin movable in the opening.

The pitch of the external thread furthermore advantageously decreases towards the supporting collar.

In this case, the pitch of the thread is preferably substantially zero in the vicinity of the supporting collar.

This makes rotation of the bolt in the opposite direction even more difficult.

At least one anti-rotation notch may also be formed in the thread.

The notch also helps to prevent rotation of the bolt by biting into the material.

BRIEF DESCRIPTION OF THE DRAWING

The invention will be more readily understood with the aid of the following description of one particular embodiment of the bolt of the invention with reference to the accompanying single figure a perspective view of the anchor bolt according to the particular embodiment.

BEST MODE FOR CARRYING OUT THE INVENTION

Figure 1:
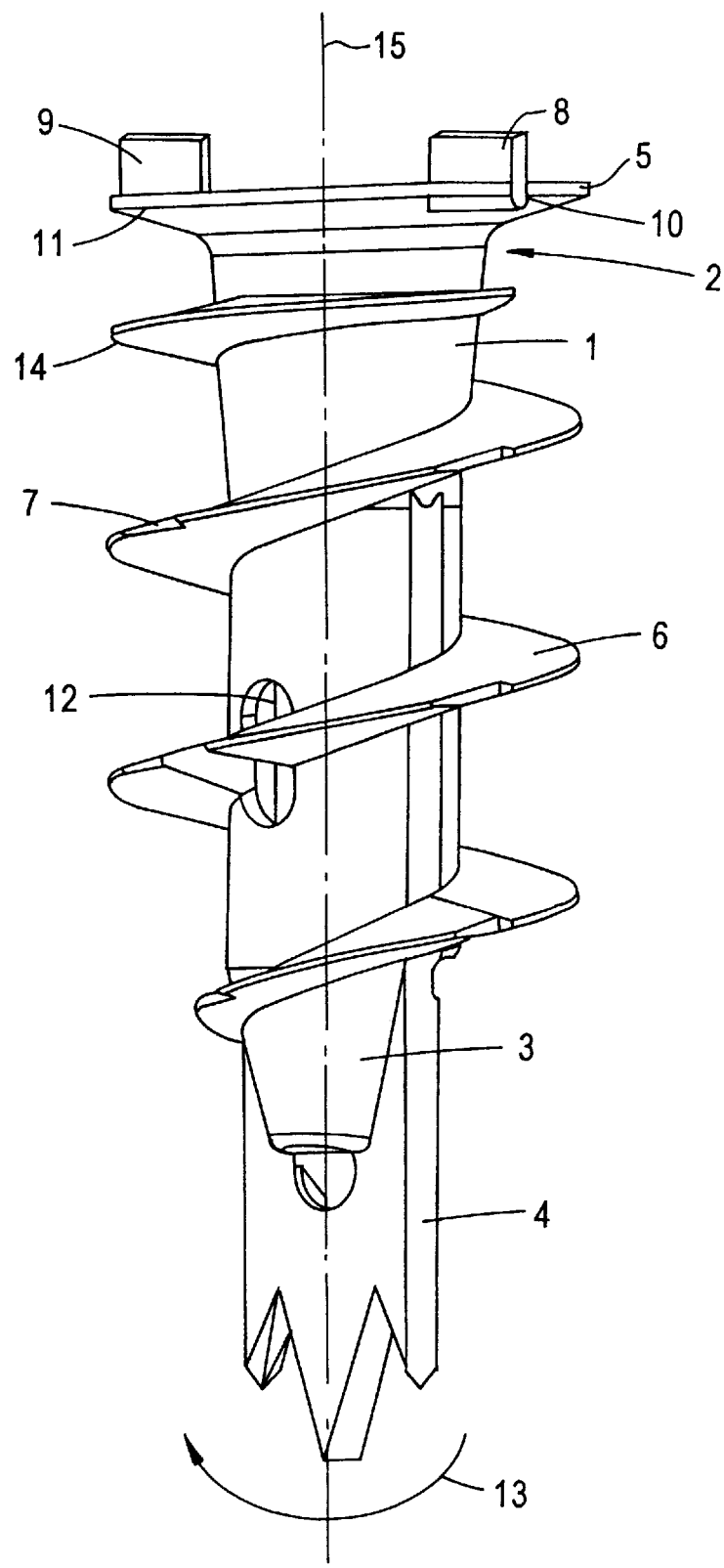

The anchor bolt, having an axis 15, is provided for fixing a fixing element in a support of friable material and comprises a generally hollow body 1, a drilling end 4 and a supporting collar 5. An axial bore extends through the hollow body 1 and through the two ends 2, 3 there of. The drilling end 4 and the supporting collar 5 are integral with the two ends 3, 2 respectively of the body 1.

The drilling end described in more detail in EP-0 165 674 is in the form of a blade provided at its free end in this case with three pointed drilling teeth.

The supporting collar 5 forms two openings 10, 11 for receiving anti-rotation pins 8, 9 removably fixed to the collar 5 and movable in the openings 10, 11. In this case, the openings 10, 11 consist of notches formed in the peripheral edge of the collar 5 diametrically opposite to one another relative to the axis 15. Both pins 8, 9 are generally in the form of a flat rectangular parallelepiped and extend in an axial plane, containing the axis 15. They project from the collar on the side of the body 1 by means of a narrowed end for penetration in a receiving material, and on the opposite side, by means of a driving part. Under the effect of striking the driving part in a direction parallel to the axis 15, directed towards the drilling end 4, the pins 8, 9 are intended to be removed from the collar 5 and to move in the openings 10, 11 in a direction parallel to the axis 15, in order to be partially pressed into the material for receiving the bolt, hence anchored both in the supporting collar 5, due to openings 10, 11, and in the receiving material. This double anchoring prevents rotation of the bolt. Therefore, the openings 10, 11 anchor the pins 8, 9 both in the supporting collar 5 and in the receiving material.

An external screw thread 6 surrounds the hollow body 1 over substantially its entire height parallel to the axis 15. The external edge of the thread in this case forms notches 7.

By definition, the pitch of the thread 6 corresponds to the height travelled along the axis of the body 1 by the thread 6 when it performs a complete revolution of 360°.

The pitch of the thread 6 decreases from the drilling end 4, where it is in this case substantially equal to 6.35 mm, to the collar 5, where it is in this case zero. The part 14 of the thread 6 situated in the vicinity of the collar 5 and having zero pitch therefore helps to make it difficult for the bolt to be rotated in the opposite direction to the direction of insertion 13.

The thickness of the thread 6 is moreover reduced towards the collar 5 in order to facilitate the insertion of the bolt into the friable material and prevent the formation of blisters in the friable material under the collar 5 when the bolt is fixed.

The hollow body 1 in this case forms an evacuation opening 12 provided along the path of the thread 6 at a point where the thread 6 is interrupted.

Further to the description of the structure of the anchor bolt, the fixing thereof in a support of friable material in the form of a dry plasterboard partition will now be described.

The bolt is inserted into the partition by "screwing", in other words, by guiding it in rotation in the direction of insertion 13 with the aid of a tool for guiding in rotation in the form of a screwing tool. When it is inserted into the friable material, the bolt itself drills its locating hole in the material with the aid of its drilling end 4. The bolt is thus guided until the supporting collar 5 comes to bear against the lip of the hole.

The driving part of the pins 8, 9 are then struck towards the support with the aid of a striking tool, in this case a hammer, the striking action removing the pins 8, 9 from the collar 5 and moving them in the openings 10, 11, by pressing them partially into the support. It should be stressed that penetration of pins 8, 9 in the receiving material is made easier by means of their narrowed ends. After partial insertion of pins 8, 9 in the support, an external part of each pin 8 (9) (exterior and interior referring to the exterior and interior of the hole) remains in the notch 10 (11). The pins 8, 9 are thus anchored both in the collar 5 and in the receiving support, and consequently prevent rotation of the bolt, especially in the opposite direction to the direction of insertion 13. Consequently the bolt does not unscrew. The pitch of the thread, as it is zero in the vicinity of the collar 5, helps to make it difficult for the bolt to be rotated in the opposite direction to the direction of insertion 13 of the bolt. The anti-rotation notches 7 biting into the material also prevent rotation of the bolt.

A fixing element with the aid of which an article can be fixed to the support is then introduced into the bore of the body 1 of the bolt.

It should be stressed that the evacuation opening 12 allows for the evacuation of the friable material which has penetrated into the bore of the body 1, in particular when the fixing element is introduced into the bolt.

In the preceding description, the supporting collar forms two openings for receiving an anti-rotation pin. It could only form one single opening, or more than two openings. The openings for receiving an anti-rotation pin could also be formed away from the edge of the supporting collar, i.e, inside the edge.

In addition, the anti-rotation pins could also not be fixed to the supporting collar and introduced in the openings during the fixing of the bolt.

What is claimed is:

1. An anchor bolt for use in friable material comprising a generally hollow body with a drilling end, a supporting collar at the other end and an external screw thread characterized by the pitch of the external screw thread decreasing toward the supporting collar.

2. A bolt according to claim 1, wherein the supporting collar includes at least one opening for receiving an anti-rotation pin movable in the opening.

3. A bolt according to claim 2, wherein the bolt has an axis and the anti-rotation pin is movable in a direction parallel to the said axis.

4. A bolt according to claim 1, wherein the anti-rotation pin extends perpendicular from the supporting collar.

5. A bolt according to claim 2, wherein the supporting collar forms two said diametrically opposite openings for respectively receiving an anti-rotation pin movable in the opening, diametrically opposite.

6. A bolt according to claim 1, wherein the pin projects from the side of the supporting collar opposite the generally hollow cylindrical body.

7. A bolt according to claim 1, wherein the pin comprises a narrowed end for penetrating into the material.

8. A bolt according to claim 1, wherein the pitch of the thread is substantially zero in the vicinity of the supporting collar.

9. A bolt according to claim 1, wherein the thickness of the thread is reduced towards the supporting collar.

10. A bolt according to claim 1, wherein the thread includes at least one anti-rotation notch.

11. An anchor for use in friable material comprising a generally hollow body with a drilling end, a supporting collar at the other end and an external screw thread characterized by the pitch of the external screw thread decreasing toward the supporting collar, comprising at least one evacuation opening formed in the body.

* * * * *